(12) United States Patent
Beals et al.

(10) Patent No.: US 8,704,959 B2
(45) Date of Patent: *Apr. 22, 2014

(54) REMOTE CONTROL DEVICE AND METHOD EMPLOYING RANDOM ADDRESSING

(75) Inventors: William Michael Beals, Englewood, CO (US); Michael T. Dugan, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,240

(22) Filed: Sep. 13, 2012

(65) Prior Publication Data
US 2013/0002966 A1  Jan. 3, 2013

Related U.S. Application Data

(63) Continuation of application No. 11/865,156, filed on Oct. 1, 2007, now Pat. No. 8,289,455.

(51) Int. Cl.
*H04N 5/44* (2011.01)
*H04N 7/20* (2006.01)
*H04N 7/173* (2011.01)

(52) U.S. Cl.
USPC ............ 348/734; 725/63; 725/68; 725/86

(58) Field of Classification Search
USPC ................. 725/63, 68, 86; 348/734
See application file for complete search history.

(56) References Cited

U.S. PATENT DOCUMENTS

| | | | |
|---|---|---|---|
| 4,535,333 A | 8/1985 | Twardowski | |
| 5,329,370 A | 7/1994 | Yazolino et al. | |
| 5,959,539 A | 9/1999 | Adolph et al. | |
| 6,072,470 A | 6/2000 | Ishigaki | |
| 6,907,029 B2 | 6/2005 | Brabrand | |
| 8,289,455 B2 * | 10/2012 | Beals et al. | 348/734 |
| 2005/0160468 A1 | 7/2005 | Rodriguez et al. | |
| 2005/0204387 A1 | 9/2005 | Knudson et al. | |
| 2006/0020993 A1 | 1/2006 | Hannum et al. | |

* cited by examiner

*Primary Examiner* — Kieu Oanh T Bui
(74) *Attorney, Agent, or Firm* — Seed IP Law Group PLLC

(57) ABSTRACT

A remote control device is presented which includes a user interface, control logic, a memory and a transmitter. The user interface is configured to accept an input from a user. The control logic is configured to generate a random number as an address for the remote control device, and to generate a command for an electronic device based on the input from the user. The command comprises the address. The memory is configured to store the address for the remote control device. The transmitter is configured to transmit the command to the electronic device.

15 Claims, 6 Drawing Sheets

REMOTE CONTROL DEVICE AND METHOD EMPLOYING RANDOM ADDRESSING

BACKGROUND

Some remote control devices (also called "remote controls," or simply "remotes") employ ultra-high frequency (UHF) signals to transmit commands to an electronic product being controlled. Since UHF signals are capable of penetrating walls and other structures within a house, the remote control device and the product to be controlled are allowed to be located in separate rooms. However, given the extensive range of these remote control devices, a remote control device intended to control one electronic product may instead unintentionally alter the operation of another product within range of the remote control device.

To remedy this problem, some UHF remote control devices now include a digital value preset at the factory that is used as an address to identify the remote control, thus allowing one remote control to be distinguished from another. For example, each remote control device may include its address within a command that is transmitted to the electronic product to be controlled. Upon receipt of the command, the product may then compare that address with an internally-stored address value, and execute the command only if the value matches the address included in the command.

However, problems may still occur if only a few distinct addresses are available, as the odds of two remotes having the same address may be significant. Further, allowing manual modification of a remote control address to solve addressing conflicts may still be problematic, as detecting such conflicts can be difficult, and mistakes in modifying the address values may occur.

DETAILED DESCRIPTION

Figure 1:
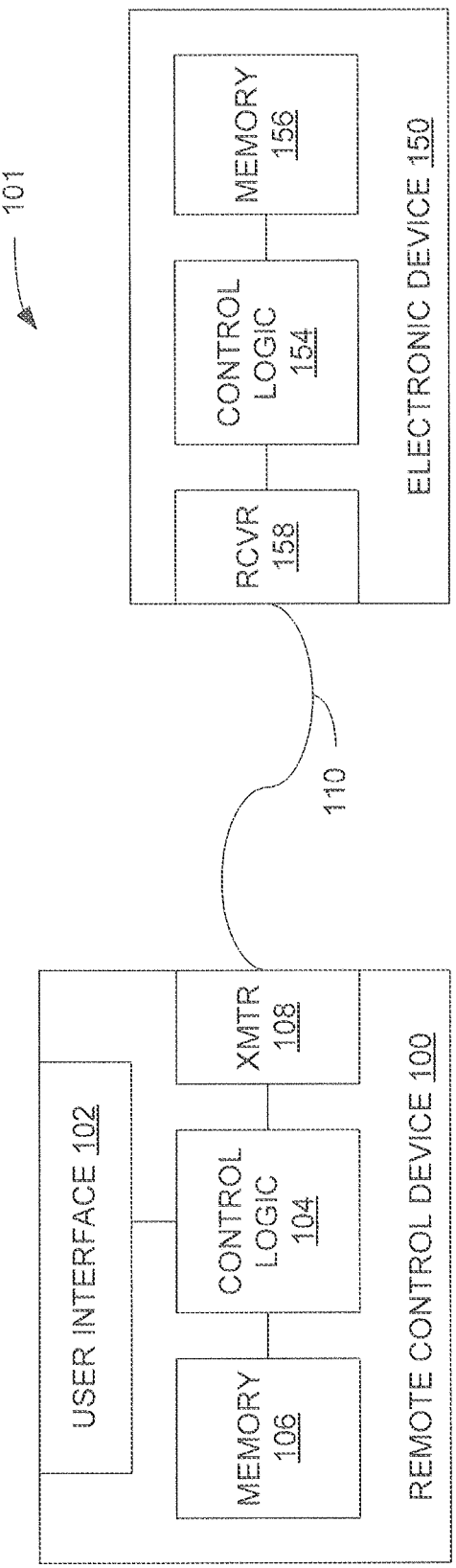
FIG. 1, is a block diagram of an electronic system including a remote control device and an associated electronic device according to an embodiment of the invention.

FIG. 1 presents a block diagram of an electronic system 101 including a remote control device 100 and an electronic device 150 configured to be controlled by the remote control device 100. In one embodiment, the remote control device 100 includes a user interface 102, control logic 104, a memory 106 and a transmitter 108. The user interface 102 is configured to accept an input from a user. The control logic 104 is configured to generate a random number as an address for the remote control device 100, and to generate a command 110 for the electronic device 150 based on the input from the user. The command 110 includes the address. The memory 106 is configured to store the address for the remote control device 100. The transmitter 108 is configured to transmit the command to the electronic device 150.

The electronic device 150 of FIG. 1 includes its own control logic 154 and memory 156, as well as a receiver 158. The receiver 158 is configured to receive the command 110 transmitted from the transmitter 108 of the remote control device 100. The memory 156 of the electronic device 150 is configured to store a first remote control device address. The control logic 154 of the electronic device 150 is configured to process the command 110 if the address within the command 110 matches the remote control device address in the memory 156 of the electronic device 150.

Figure 2:
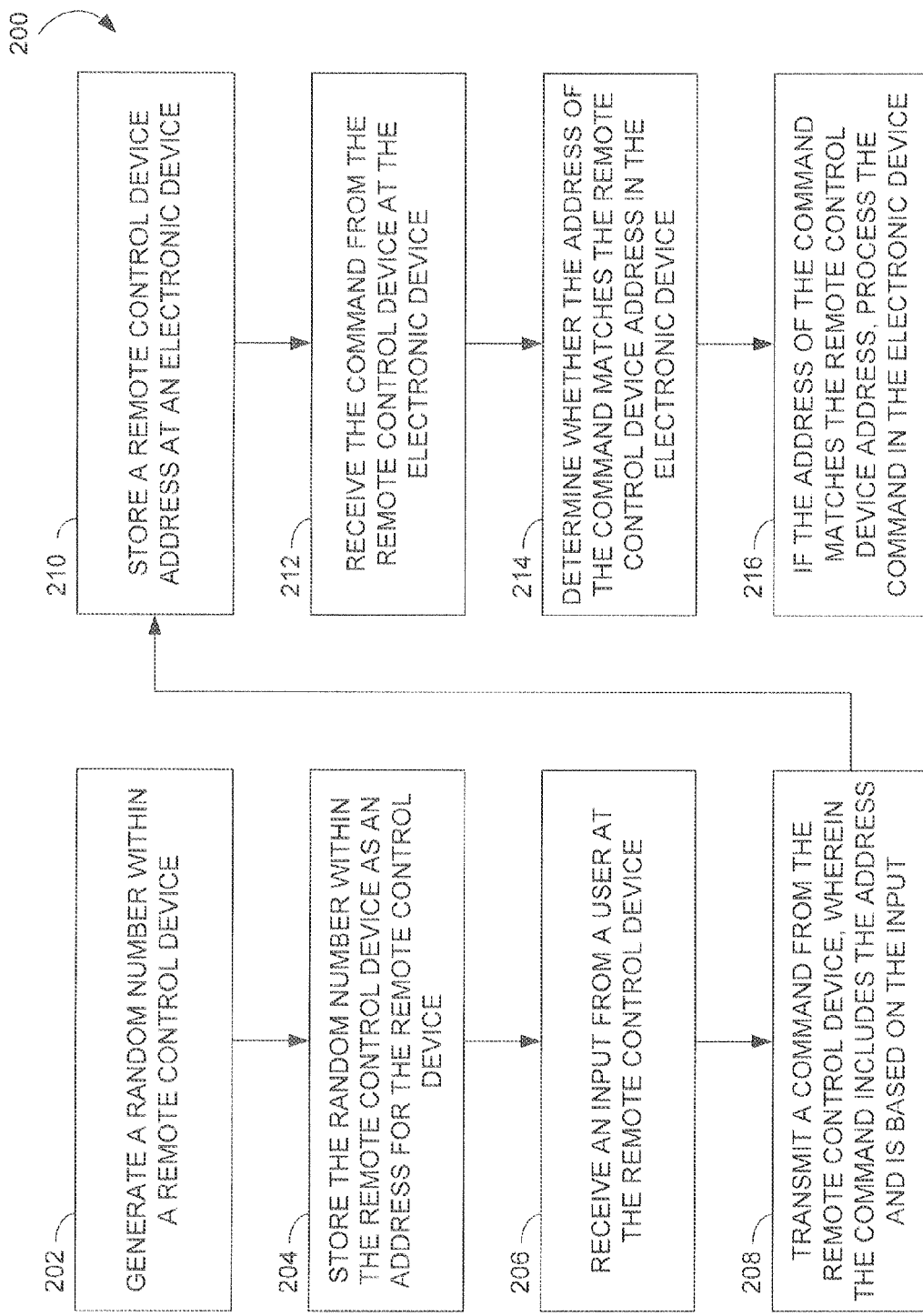
FIG. 2 is a flow diagram of a method for facilitating communication between a remote control device and an electronic device according to an embodiment of the invention.

Another embodiment, a method 200 for facilitating communication between a remote control device and an associated electronic device, is depicted by way of flow diagram in FIG. 2. In the method 200, a random number is generated within the remote control device (operation 202). The random number is then stored within the remote control device as an address for the remote control device (operation 204). An input from a user is received at the remote control device (operation 206). A command based on the input from the user is then transmitted from the remote control device (operation 208), wherein the command includes the address.

At the electronic device, a remote control device address is stored therein (operation 210). The command from the remote control device is received at the electronic device (operation 212). A determination is then made as to whether the address within the command matches the remote control device address in the electronic device (operation 214). If so, the command is processed in the electronic device (operation 216).

The flow diagram provided in FIG. 2, as well as others presented and described herein, each represent one possible order in which the operations indicated therein are accomplished. However, other orders of execution involving these same operations are also possible while remaining within the scope of the invention.

Figure 3:
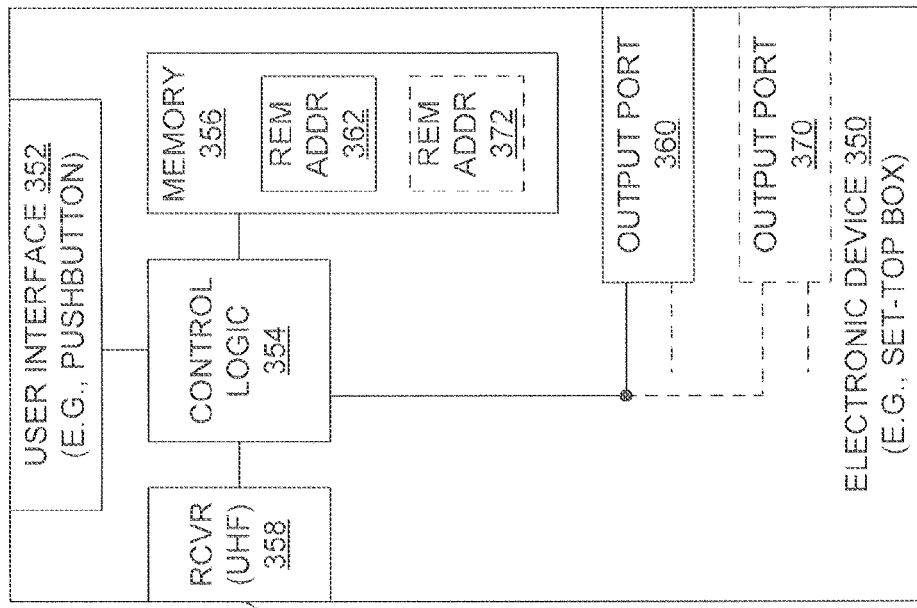
FIG. 3 is a block diagram of an electronic system including a remote control device and an associated electronic device according to another embodiment of the invention.
Figure 3:
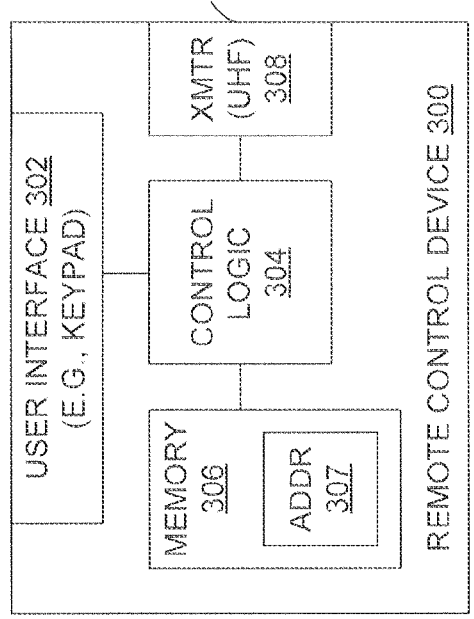

Another embodiment—an electronic system 301, including a remote control device 300 and an electronic device 350 configured to be controlled by way of the remote control device 300—is depicted in the block diagram of FIG. 3. In this particular implementation, the electronic device 350 may be a satellite broadcast receiver or set-top box (STB). However, in other embodiments, other electronic devices, such as cable STBs, televisions (TVs), compact disc (CD) and digital video disc (DVD) players, audio receivers, and the like, may serve as the electronic device 350 of FIG. 3. The electronic device 350 includes control logic 354, a memory 356 and a receiver 358. Further, in some embodiments the electronic device 350 may incorporate a user interface 352 and at least one output port 360. In another implementation, the electronic device may include a second output port 370. The electronic device 350 may include other components to provide functionality not described herein, but such components are not discussed for reasons of simplicity and brevity.

The remote control device 300 of FIG. 3 includes a user interface 302, control logic 304, a memory 306, and a transmitter 308. Other aspects typically associated with a remote control device 300, such as a battery compartment for holding one or more batteries for supplying power to the remote control device 300, are not shown in FIG. 3 to simplify and facilitate the discussion of the various embodiments disclosed herein.

In one embodiment, the control logic 304 of the remote control device and the control logic 354 of the electronic device 350 may include digital hardware circuitry, a processor upon which control firmware or software executes, or some combination thereof. Also, the transmitter 308 and the receiver 358 may each be a transceiver allowing two-way communication in another embodiment.

Figure 4:
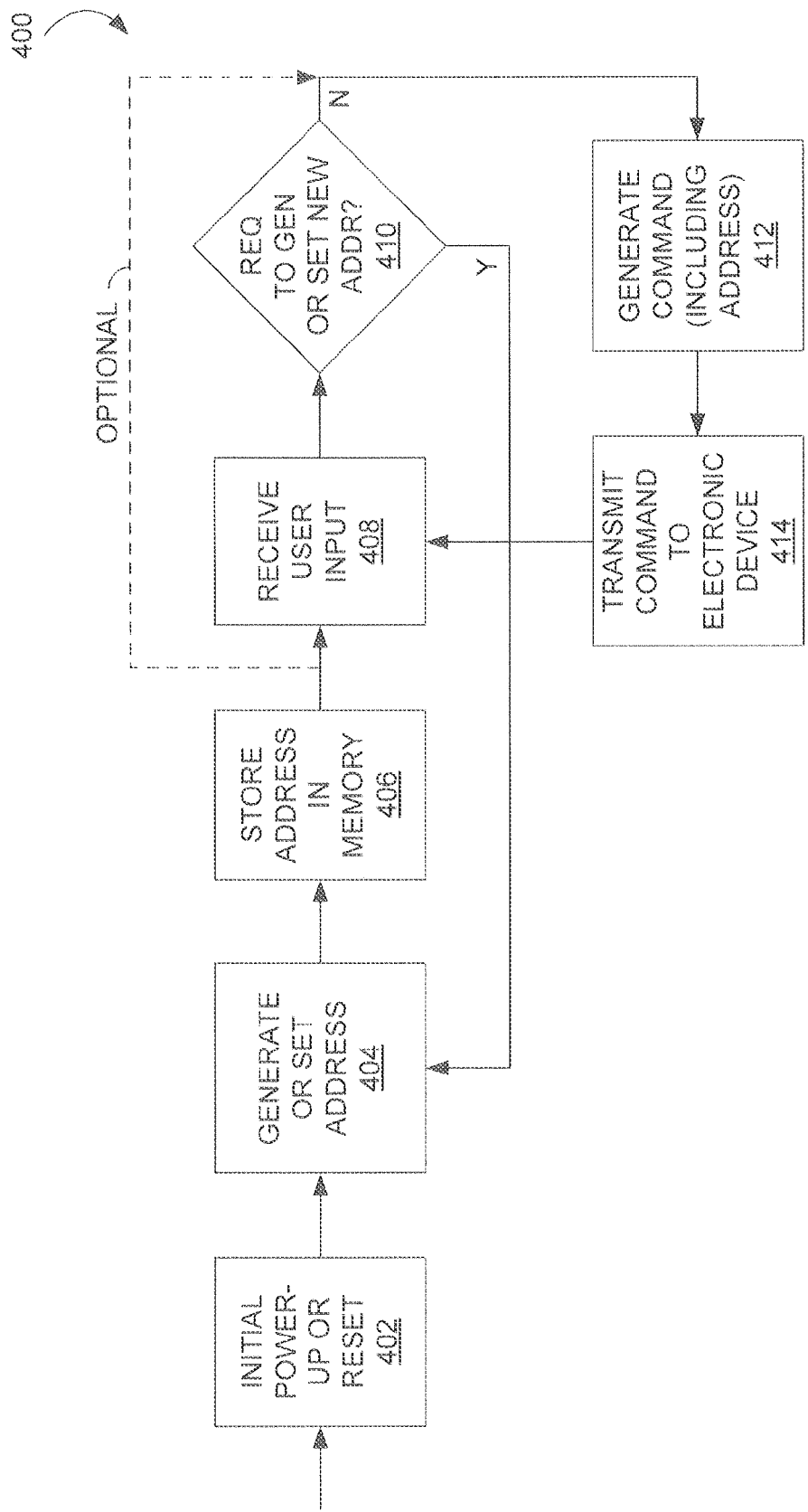
FIG. 4 is a flow diagram of a method for generating and transmitting commands from the remote control device to the electronic device depicted in FIG. 3 according to an embodiment of the invention.

A method 400 for generating and transmitting commands from the remote control device 300 to the electronic device 350 is depicted by way of flow diagram in FIG. 4. The control logic 304 of the remote control device 300 is configured to generate a random number to be employed as an address to identify the remote control device 300 (operation 404). Herein, the random number may be a truly random number or a pseudo-random number, such as what might be generated by way of a deterministic logic circuit, such as a processor or other digital electronic circuit. The random number may also be any generated number exhibiting at least some level of statistical randomness. The random number is employed as an address associated with the remote control. The use of the random number is described in greater detail below.

The control logic 304 may generate the random number in response to a number of conditions. For one, the control logic 304 may generate the random number in response to an initial power-up or reset of the remote control device 300 (operation 402). Such a power-up or reset may occur when batteries used to power the remote control device 300 are first placed into the remote control device 300 by the user after delivery of the device 300 to the user. A reset may also occur by way of a specific action of the user, such as the pressing of a reset button of the remote control device 300. In another embodiment, generation of the random number by the control logic 304 may be instigated at some point during the manufacturing process prior to delivery of the remote control device 300 to the user.

After generating the random number, the control logic 304 is configured to store the random number as an address 307 for the remote control device 300 in the memory 306 of the device 300 (operation 406). In one example, the memory 306 may be a nonvolatile memory, such as a flash memory or ferroelectric memory, so that loss of electrical power, such as removal or exhaustion of a battery from the remote control device 300, does not cause loss of the address 307 value. In another embodiment, a volatile memory may be used for the memory 306, especially if battery life is not an issue. As described later, the control logic 304 accesses the address 307 in the process of communicating with the target electronic device 350.

The user interface 302 of the remote control device 300 is configured to accept input from a user (operation 408). In one implementation, the user interface 302 includes a keypad for a user to input or enter commands to control various functions of the electronic device 350, such as changing channels, altering a volume level, accessing a function selection menu, and so on. Other input devices, such as a touchpad, a roller ball. a joystick, or a microphone coupled with a voice recognition circuit, allowing a user to input information into the remote control device 300, may also be included in other examples.

By way of the input to the user interface 302, the user may request by way of the user interface 302 that a new address for the remote control device 300 be generated to replace a previous address (operation 410). Such a request may be made by way of one or more keystrokes on a keypad of the user interface 302, for example. In addition, the user may request that the address for the remote control device 300 be set to a specific value indicated by way of the user interface 302 (also operation 410). In response, the control logic 304 generates or sets the random number as requested (operation 404) and stores the number as the new address 307 for the remote control device 300 in the memory 306 (operation 406).

Figure 5:
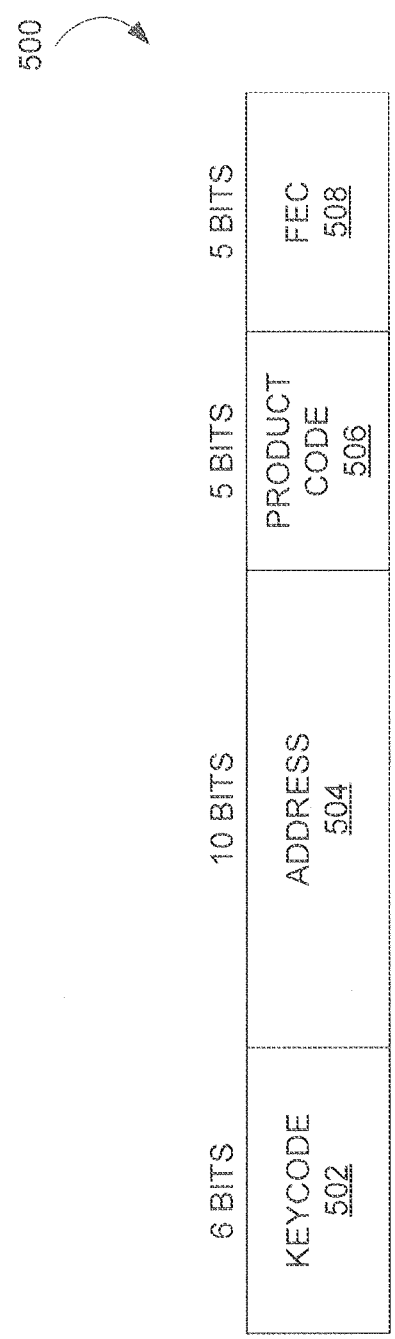
FIG. 5 is a diagram indicating a format of a command packet transmitted from the remote control device of FIG. 3 according to an embodiment of the invention.

Besides requesting that a new address 307 being generated or set, the user may also input various command requests intended for the electronic device 350 by way of the user interface 302. Typically, many command requests are issued between requests to set or generate a new address 307, as the need to alter the address 307 should occur only sparingly. In response to each of these command requests, the control logic 304 is configured to generate a command 310 for the electronic device 350 to be controlled based on the user input (operation 412). The control logic 304 incorporates the address 307, read from the memory 306, into the command. FIG. 5 shows one possible format of a command packet 500 generated by the control logic 304. This particular 26-bit packet 500 includes a 6-bit keycode 502, a 10-bit address 504, a 5-bit product code 506 and a 5-bit forward error correction (FEC) code 508. The keycode 502 indicates the command or action to be executed or performed at the electronic device 350. The address 504 corresponds with, and may be identical to, the address 307 stored in the memory 306 of the remote control device 300. In this particular case, the use of a 10-bit address, thus allowing for 1024 separate addresses for the remote control device 300, provides a significant amount of protection against two remote control devices 300 within range of the same electronic device 350 exhibiting the same address. The product code 506 indicates the product or model number of the particular electronic device 350 being controlled. The FEC code 508 is redundant information to be employed by the electronic device 350 to detect and possibly correct one or more errors in the command packet 500 after the packet 500 is received at the electronic device 350.

The specific packet 500 format of FIG. 5 represents merely one of many possible command formats. For example, some formats may not include a forward error code 508, but may instead provide an error detection code, or no error correction or detection code at all. In another possible command format, a product code 506 may not be included. Other command packet 500 formats may employ varying numbers of bits for each of the keycode 502, the address 504, the product code 506, and the forward error correction code 508.

Once generated, the command 310 incorporating the address 307 from the memory 306 is transferred to the transmitter 308, which is configured to transmit the command 310 to the electronic device 350 (operation 414). In one embodiment, the transmitter 308 is an ultra-high frequency (UHF) transmitter, thus allowing transmission of the command 310 to the electronic device 350 without the benefit of line-of-sight, such as through walls or other structures of a house, apartment or other building. In one implementation, the transmitter 308 operates in the 300 megahertz (MHz) to 3 gigahertz (GHz) frequency range. Other wireless technologies may be employed for the transmission of the command 310 in other embodiments, such as infrared (IR) light and other optical transmission methods, or ultrasonic waves and other acoustic communication means. The control logic 304 may then process other command requests from the user received by way of the user interface 302 in a similar fashion.

In one embodiment, a command may be generated (operation 412) and transmitted (operation 414) as described above in response to the generation of a new address 307 for the remote control device 300. Thus, the newly-generated address 307 is made immediately available to the electronic device 350 to link the remote control device 300 to the target electronic device 350 as described in greater detail below. In one embodiment, the command may have no actual effect on the electronic device 350, such as a change in channel or volume, other than to inform the electronic device 350 of the new address 307 once the address 307 is generated within the remote control device 300.

Figure 6:
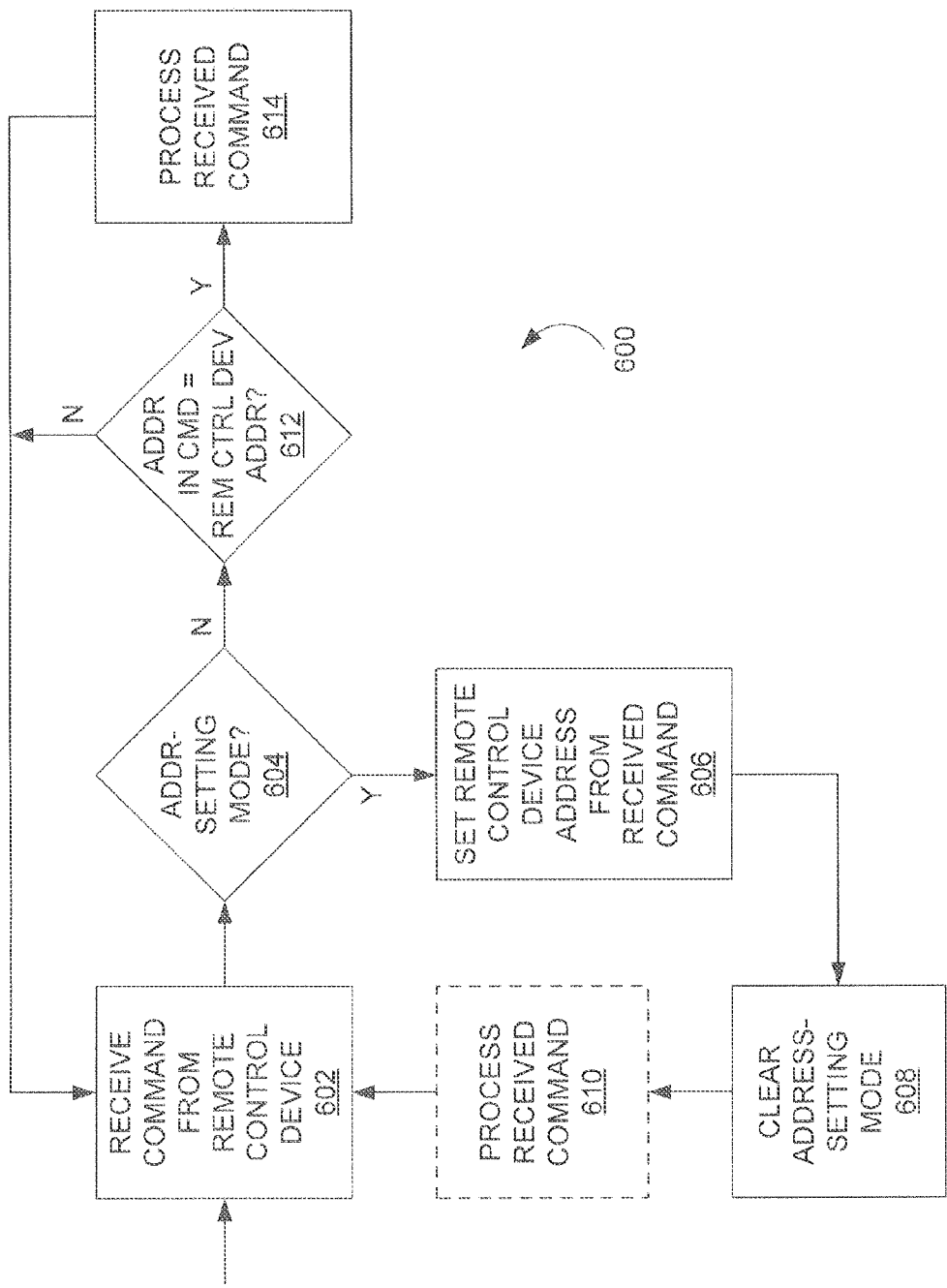
FIG. 6 is a flow diagram of a method for receiving and processing commands at the electronic device from the remote control device shown in FIG. 3 according to an embodiment of the invention.

FIG. 6 provides a flow diagram of a method 600 for receiving and processing the commands from the remote control device 300 in the electronic device 350 of FIG. 3. In the method 600, the receiver 358 is configured to receive the command 310 from the remote control device 300 (operation 602 of FIG. 6). In the specific embodiment of FIG. 3, the receiver 358 is a UHF receiver compatible with the UHF transmitter 308 of the remote control device 300. However, as noted above in conjunction with the transmitter 308, the receiver 358 may employ different wireless technologies in other embodiments, such as infrared (IR) light and other optical transmission means, or ultrasonic signals and other acoustic communication methods.

Similar to the memory 304 of the remote control device 300, the memory 356 of the electronic device 350 is configured to store a remote control device address 362. In one example, the memory 356 is a nonvolatile memory, such as a flash memory or ferroelectric memory, thus allowing the remote control device address 362 to be retained in the event of a power failure. To initialize the remote control device address 362, the electronic device 350 may make use of a special address-setting mode during which a command received by way of the receiver 358 may be utilized to set the remote control device address 362 for future received commands. More specifically, the control logic 354 may be configured to set the electronic device 350 to the address-setting mode in response to a user-initiated action. In one embodiment, the user-initiated action occurs by way of an input through the user interface 352. The user interface 352 may include, for example, a push button or similar means for indicating to the control logic 354 of the electronic device 352 to enter the address-setting mode. Other user interface means, such as a joystick, roller ball, or a microphone coupled with a voice recognition circuit, may be utilized. In another example, the control logic 354 may enter the address-setting mode after a reset of the electronic device 350, such as by way of a reset button of the electronic device 350, or via cycling power to the electronic device 350. In another embodiment, the control logic 354 may enter the address-setting mode in response to a remote command received at the electronic device 350 by way of satellite communication, phone or Internet connection, or other remote communication methods. Such a remote command may be issued by, for example, a customer support person located at a call center in response to a phone request from a user.

If the electronic device 350 exhibits the address-setting mode at the time a command has been received at the receiver 358 (operation 604), the control logic 354 sets the remote control device address 362 in the memory 356 to the address of the command 310 (e.g., the address 504 of the command packet 500) first received by way of the receiver 358 after the address-setting mode has been entered (operation 606). Thereafter, the control logic 354 then clears the address-setting mode (operation 608) to process other commands normally. In one implementation, this command 310 received during address-setting mode is processed normally (operation 610); in another embodiment, the command 310 is ignored.

If, instead, the address-setting mode is not active at the time a command is received, the control logic 354 compares the address of the command 310 (e.g., address 504 of the command packet 500 of FIG. 5) to the remote control device address 362 stored in the memory 356 of the electronic device 350 (operation 612). If the received address matches the remote control device address 362, the control logic 350 processes the command 310 (operation 614). Otherwise, the control logic 354 ignores the command 310.

In the embodiment of FIG. 3, the received command 310 may be processed to control or modify the operation of the output port 360. Presuming the electronic device 350 is a satellite broadcast STB, the output port 360 may deliver programming received from a satellite to a TV (not shown in FIG. 3) coupled therewith. The output port 360 may be identified with a tuner and associated circuitry for selecting one of a number of satellite programming channels available from a television or radio broadcast satellite. For example, the command 310 may request a change in selected channel, modification of audio volume, control of viewing operations, such as rewind, fast-forward, pause and the like, as well as any other functions typically associated with an output port. Similarly, the output port 360 may also be coupled with a digital video recorder (DVR) unit residing within the STB 350, thereby allowing a user to employ the remote control device 300 to control the recording and playback of programming to and from the DVR.

As described above, the operation of various embodiments of the remote control device 300 and the electronic device 350 provides a secure yet flexible communication scheme therebetween. By randomly generating its own address, the remote control device 300 likely distinguishes itself from other remote control devices that may be located within communication range of the target electronic device 350. By then distinguishing commands transmitted by the remote control device 300 from other remote control devices, inadvertent control of the electronic device 350 by the other remotes is greatly reduced or eliminated while allowing the remote control device 300 associated with the electronic device 350 complete control of that device 350. Further, embodiments enabling the user to both generate or set a new address for the remote control device 300 and place the electronic device 350 into an address-setting mode at any time allow the user to change the address 307 quickly to resolve any addressing conflicts with nearby remote control devices.

In one embodiment, the electronic device 350 of FIG. 3 may include two or more output ports 360, 370, wherein each port may be coupled with a separate TV (not shown in FIG. 3). Presuming the TVs are located in separate rooms of a house or other building, the user may desire that each of two separate remote control devices 300 be associated with distinct output ports 360, 370. To support this functionality, the electronic device 350 may store two separate remote control device addresses 362, 372 within its memory 356. Further, the control logic 354 may then compare the address 307 of each received command 310 against both remote control device addresses 362, 372 to determine if the command 310 is to be processed for the first output port 360, the second output port 370, or neither port 360, 370. In another embodiment, both output ports 360, 370 may be controlled by the same remote control device 300.

In another example, the electronic device 350 may provide a dual-display functionality, such as a picture-in-picture feature found in some STBs and TVs. In such an implementation, the electronic device 350 may be configured to store separate remote control addresses within the memory 356, one for each picture "window" or display being presented simultaneously to the user, thus allowing each picture display to be controlled by a separate remote control device 300.

In another embodiment, the control logic 304 of the remote control device 300 allows a user, by way of the user interface 302, to command the electronic device 350 to indicate the remote control device address 362 currently stored in the memory 356. Such an indication may be provided by way of the TV coupled with the associated output port 360, by way of a display provided directly by the electronic device 350, or some other means. Providing the user the ability to determine the remote control device address 362 allows the user to set one or more remote control devices 300 to the same address 307, thus enabling those multiple remote control devices 300 to control the same electronic device 350, or the same output port 360 within the electronic device 350. Such capability may be desirable when a single electronic device 350 or output port 360 thereof is employed for multiple TVs within a single home or apartment.

If multiple remote control devices 300 may control a single electronic device 350, or a single output port 360 within a single electronic device 350, the control logic 354 of the electronic device 350 may instead be configured to store multiple remote control device addresses 362, 372 for the single electronic device 350 or output port 360, thus possibly eliminating the need for setting a specific address 307 within the remote control device 300 to match the address 307 of another remote control device 300.

While several embodiments of the invention have been discussed herein, other embodiments encompassed by the scope of the invention are possible. For example, while embodiments of the invention have been described in connection with satellite broadcast STBs, such as those normally associated with video and audio programming, other electronic devices, such as cable television STBs, CD and DVD players, audio receivers, and other electronic devices, may benefit from application of the concepts described herein. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

The invention claimed is:

1. An electronic device comprising:
   a receiver configured to receive a first command transmitted from a remote control device, the first command including a remote control address;
   a user interface configured to accept an input from a user;
   a memory configured to store data; and
   control logic configured to store the remote control address in the memory and to execute the first command if the first command is an initial command received at the receiver after the user interface accepts the input, the control logic being, further configured to execute a second command if the second command includes the remote control address stored in memory.

2. The electronic device of claim 1 comprising an output port configured to output a first picture display and a second picture display, the remote control device address is associated with the first picture display, the second remote control device address stored in the memory is associated with the second picture display.

3. The electronic device of claim 1 comprising:
   as first output port; and
   a second output port, the remote control device address being associated with the first output port, a second remote control device address being associated with the second output port.

4. The electronic device, of claim 1, comprising:
   a first output port; and
   a second output port, the remote control device address and a second remote control address stored in memory being associated with the first output port.

5. The electronic device of claim 1 comprising:
   a first output port; and
   a second output port, the remote control device being associated with the first output port and the second output port.

6. The electronic device of claim 1 comprising a communication interface configured to receive a remote input, the control logic being configured to store the remote control address within a second command received at the receiver as the remote control device address if the second command is the next command received after the communication interface receives the remote input.

7. The electronic device of claim 6 wherein the communication interface comprises at least one of a satellite communication interface, a phone connection, and an internet connection.

8. The electronic device of claim 1 wherein the wherein the control logic is configured to store the address within a second command received by the receiver as the remote control device address if the second command is the initial command following a reset of the electronic device.

9. The electronic device of claim 1, further comprising one of a satellite broadcast receiver and a cable broadcast receiver.

10. A remote control device comprising:
    a user interface configured to accept an input from as user;
    control logic configured to generate a random number as an address for the remote control and to generate a command for the electronic device based on the input from the user, wherein the command comprises the address;
    a memory configured to store the address for the remote control device; and
    a transmitter configured to transmit a command to the electronic device, the command including the random number, the command being configured to cause the electronic device to store the random number in memory as an address and to execute the command.

11. The remote control device of claim 10, wherein the transmitter comprises one of an ultra-high frequency transmitter, an infrared transmitter, and an ultrasonic transmitter.

12. The remote control device of claim 10, wherein the control logic is configured to generate the address upon an initial power-up of the remote control device.

13. The remote control device of claim 10, wherein the control logic is continued to generate the address upon a reset of the remote control device.

14. The remote control device of claim 10 wherein the user interface is configured to accept a request from the user to change the address associated with the remote control device, and wherein the control logic is configured to generate a new random number as the address in response to the request.

15. The remote control device of claim 10 wherein the user interface is configured to accept a request from the user to set the address associated with the remote control device to a specific value, and wherein the control logic is configured to set the address to the specific value in response to the request.

* * * * *

UNITED STATES PATENT AND TRADEMARK OFFICE
CERTIFICATE OF CORRECTION

PATENT NO.         : 8,704,959 B2                                              Page 1 of 1
APPLICATION NO.    : 13/615240
DATED              : April 22, 2014
INVENTOR(S)        : William Michael Beals et al.

It is certified that error appears in the above-identified patent and that said Letters Patent is hereby corrected as shown below:

In the Claims

Claim 1, Column 7, Line 53:
"control logic being, further configured to execute a" should read, --control logic being further configured to execute a--.

Claim 1, Column 7, Line 63:
"as first output port; and" should read, --a first output port; and--.

Claim 4, Column 8, Line 5:
"4. The electronic device, of claim 1, comprising:" should read, --4. The electronic device of claim 1, comprising:--.

Claim 8, Column 8, Line 26:
"8. The electronic device of claim 1 wherein the wherein the" should read, --8. The electronic device of claim 1 wherein the--.

Claim 13, Column 8, Line 53:
"control logic is continued to generate the address upon a reset" should read, --control logic is configured to generate the address upon a reset--.

Signed and Sealed this
Twenty-third Day of September, 2014

Michelle K. Lee
*Deputy Director of the United States Patent and Trademark Office*